U
nited States Patent [19]

Newkirk et al.

[11] Patent Number: 4,871,696

[45] Date of Patent: * Oct. 3, 1989

[54] METHOD FOR PRODUCING SUBSTANTIALLY PURE MATERIALS

[75] Inventors: Marc S. Newkirk, Newark, Del.; Mark G. Mortenson, North East, Md.

[73] Assignee: Lanxide Technology Company, LP, Newark, Del.

[*] Notice: The portion of the term of this patent subsequent to Apr. 11, 2006 has been disclaimed.

[21] Appl. No.: 168,198

[22] Filed: Mar. 15, 1988

Related U.S. Application Data

[63] Continuation-in-part of Ser. No. 907,934, Sep. 16, 1986.

[51] Int. Cl.$^4$ .............................................. C04B 35/02
[52] U.S. Cl. ..................................... 501/94; 501/127; 501/153; 423/132; 423/412; 423/625
[58] Field of Search ............... 423/132, 345, 411, 412, 423/618, 625; 264/233, 344, 65; 501/153, 88, 92, 96, 98, 94, 89, 119, 127, 128, 87, 134, 120, 108, 123, 126; 75/235

[56] References Cited

U.S. PATENT DOCUMENTS

| | | |
|---|---|---|
| 228,867 | 6/1880 | Chadwick et al. .................. 423/132 |
| 1,079,899 | 11/1913 | Chappell .............................. 423/132 |
| 1,798,261 | 3/1931 | Horsfield ............................. 423/132 |
| 2,741,822 | 4/1956 | Udy . |
| 3,255,027 | 6/1966 | Talsma . |
| 3,296,002 | 1/1967 | Hare . |
| 3,298,842 | 1/1967 | Seufert . |
| 3,419,404 | 12/1968 | Mao . |
| 3,421,863 | 1/1969 | Bawa . |
| 3,437,468 | 4/1967 | Seufert . |
| 3,473,938 | 10/1969 | Oberlin . |
| 3,473,987 | 10/1969 | Sowards . |
| 3,789,096 | 1/1974 | Church . |
| 3,864,154 | 2/1975 | Gazza et al. . |
| 3,973,977 | 8/1976 | Wilson . |
| 4,567,026 | 1/1986 | Lisowyj .............................. 423/132 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 339028 | 12/1930 | United Kingdom ................. 423/132 |

OTHER PUBLICATIONS

"Oxidation of Molten Aluminum Alloys. Reaction with Refractories"—M. Drouzy and M. Richard—Mar., 1974—Fonderie, France No. 332, pp. 121-128.

"Refractories for Aluminum Alloy Melting Furnaces'"—B. Clavaud and V. Jost—Sep., 1980—Lillian Brassinga (from French) Jan., 1985.

Primary Examiner—William R. Dixon, Jr.
Assistant Examiner—Andrew B. Griffis
Attorney, Agent, or Firm—Mark G. Mortenson; Michael K. Boyer

[57] ABSTRACT

A method for producing materials having a high purity, which comprises forming an oxidation reaction product of a parent metal and an oxygen-containing vapor-phase oxidant, comminuting the resulting ceramic body and leaching any non-oxidation reaction product and/or corresponding filler materials therefrom, and recovering said substantially pure materials.

8 Claims, No Drawings

METHOD FOR PRODUCING SUBSTANTIALLY PURE MATERIALS

CROSS-REFERENCE TO RELATED APPLICATION

This application is a continuation-in-part of Commonly Owned and Copending U.S. patent application No. 907,934, filed Sept. 16, 1986, in the name of Marc S. Newkirk, and entitled "Method for Producing Substantially Pure Alumina Materials".

FIELD OF INVENTION

This invention relates to a method for producing substantially pure materials. More particularly, this invention relates to a method for producing a substantially pure material derived from the comminuted and purified product of an unusual oxidation reaction process utilizing various parent metals and an oxygen-containing gas. The invention also relates to a method for upgrading the quality of a lower purity materials to yield higher purity products.

BACKGROUND AND DESCRIPTION OF COMMONLY OWNED PATENT APPLICATIONS

The following Commonly Owned Patent and Patent Applications describe novel methods for producing a self-supporting ceramic body by oxidation of a parent metal to form a polycrystalline material of an oxidation reaction product and, optionally, metallic constituents:

(A) U.S. Pat. No. 4,713,360, which issued on Dec. 15, 1987 from U.S. patent application Ser. No. 818,943, filed Jan. 15, 1986, which is a Continuation-in-Part of Ser. No. 776,964, filed Sept. 17, 1985, which is a Continuation-in-Part of Ser. No. 705,787 filed Feb. 26, 1985, which is a Continuation-in-Part of U.S. application Ser. No. 591,392 filed Mar. 16, 1984, all in the name of Marc S. Newkirk et al and entitled "Novel Ceramic Materials and Methods for Making the Same"; and (B) Ser. No. 822,999, filed Jan. 27, 1986, which is a Continuation-in-Part of Ser. No. 776,965 filed Sept. 17, 1985, which is a Continuation-in-Part of Ser. No. 747,788 filed June 25, 1985, which is a Continuation-in-Part of Pat. Ser. No. 632,636, filed July 20, 1984, all in the name of Marc S. Newkirk et al and entitled "Methods of Making Self-Supporting Ceramic Materials"; and (C) Ser. No. 819,397 filed Jan. 7, 1986 which is a Continuation-in-Part of Ser. No. 697,876, filed Feb. 4, 1985, both in the name of Marc S. Newkirk et al. and entitled "Composite Ceramic Articles and Methods of Making Same."

The entire disclosures of each of the aforesaid Commonly Owned Patent Applications and Patent are incorporated herein by reference.

As explained in these Commonly Owned Patent Applications, novel polycrystalline ceramic materials or polycrystalline ceramic composite materials are produced by the oxidation reaction between a parent metal and a vapor-phase oxidant, i.e. a vaporized or normally gaseous material, as an oxidizing atmosphere. The method is disclosed generically in the aforesaid Commonly Owned Patent. In accordance with this generic process, a parent metal, e.g. aluminum, is heated to an elevated temperature above its melting point but below the melting point of the oxidation reaction product to form a body of molten parent metal which reacts upon contact with a vapor-phase oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. In the case of an oxide as the oxidation reaction product, oxygen or gas mixtures containing oxygen (including air) are suitable oxidants, with air usually being preferred for obvious reasons of economy. However, oxidation is used in its broad sense in all of the Commonly Owned Patent Applications and Patent and in this application, and refers to the loss or sharing of electrons by a metal to an oxidant which may be one or more elements and/or compounds.

In certain cases, the parent metal may require the presence of one or more dopants in order to favorably influence or facilitate growth of the oxidation reaction product, and the dopants are provided as alloying constituents of the parent metal. For example, in the case of aluminum as the parent metal and air as the oxidant, dopants such as magnesium and silicon, to name but two of a larger class of dopant materials, are alloyed with aluminum and utilized as the parent metal. The resulting oxidation reaction product comprises alumina, typically alpha-alumina.

The aforesaid Commonly Owned Patent Applications (B) disclose a further development based on the discovery that appropriate growth conditions as described above, for parent metals requiring dopants, can be induced by applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. With this improvement, it is feasible to use commercially available metals and alloys which otherwise would not contain or have appropriately doped compositions. This discovery is advantageous also in that ceramic growth can be achieved in one or more selected areas of the parent metal's surface rather than indiscriminately, thereby making the process more efficiently applied, for example, by doping only one surface, or only portion(s) of a surface, of a parent metal.

Thus, the aforesaid Commonly Owned Patent and Patent Applications describe the production of alumina as an oxidation reaction product readily "grown" to relatively large sizes, which then can be a useful source for alumina products. The present invention provides a method for obtaining substantially pure materials derived from corresponding oxidation reaction products produced by the aforementioned oxidation reaction process wherein various parent metals can be reacted with an oxygen-containing vapor-phase oxidant.

Novel ceramic composite structures and methods of making them are disclosed and claimed in the aforesaid Commonly Owned Patent Applications (C) which utilize the oxidation reaction to produce ceramic composite structures comprising a substantially inert filler infiltrated by the polycrystalline ceramic matrix. A parent metal positioned adjacent to a mass of permeable filler is heated to form a body of molten parent metal which is reacted with a vapor-phase oxidant, as described above, to form an oxidation reaction product. As the oxidation reaction product grows and infiltrates the adjacent filler material, molten parent metal is drawn through previously formed oxidation reaction product into the mass of filler and reacts with the oxidant to form additional oxidation reaction product at the surface of the previously formed product, as described above. The resulting growth of oxidation reaction product infiltrates or embeds the filler and results in the formation of a ceramic composite structure of a polycrystalline ceramic matrix embedding the filler. For example, in the case of employing doped aluminum as the parent metal, air as the oxidant, and alumina particles or powder as the permeable filler, a composite is formed as described above which typically consists essentially of alumina particles in an alumina matrix having various metallic constituents dispersed therethrough.

In a further aspect of the present invention, it has been discovered that in the process of growing an oxidation reaction product as a matrix through a corresponding filler material ("corresponding" here is to be intended to mean that the oxidation reaction product has a chemical composition which is similar to or substantially the same as the filler material e.g., if the oxidation reaction product comprises primarily $ZrO_2$, the "corresponding" filler material could be a material which comprises at least 50 percent by weight $ZrO_2$, or it could be a material which contains at least 50 percent by weight of chemical elements which will appear in the final product e.g., in the case of $ZrO_2$ as an oxidation reaction product, the relevant chemical elements in the filler material would be Zr and $O_2$), that when relatively impure forms of filler materials are employed, particularly those containing silicates, they react with the parent metal during the process to yield purer materials and reduced metallic constituents, such as silicon. The process therefore can provide a source of high purity materials from a lower purity source material.

SUMMARY OF THE INVENTION

In one embodiment of this invention, a parent metal is heated in the presence of an oxygen-containing vapor-phase oxidant to form a body of molten parent metal. As molten parent metal contacts the oxidant, oxidation reaction product is formed. The process conditions are maintained to progressively draw molten metal through the formed oxidation reaction product and toward the oxidant so as to continuously form oxidation reaction product at the interface between the oxygen-containing vapor-phase oxidant and previously formed oxidation reaction product. The heating step is conducted at temperatures above the melting point of the parent metal, but below the temperature of the oxidation reaction product. The heating is continued for such time as is necessary to produce a polycrystalline ceramic body. The body may include one or more metallic materials such as nonoxidized parent metal, dopants, or both.

This invention is based on the discovery that substantially all of the non-oxidation reaction product materials present in the polycrystalline ceramic product produced as discussed above are (a) after comminuting of the ceramic product are, accessible from the surfaces of the comminuted ceramic product and (b) are primarily metallic rather than ceramic. The non-oxidation reaction product materials (e.g., primarily metallic materials) can then be extracted, dissolved or dispersed from the ceramic body by one or more leachants, whether gas or liquid, hereinafter referred to as "leaching agents" and "leaching." A series of leaching stages may be desirable, with, typically, utilization of a water wash between each leaching step or stage.

The polycrystalline material thus obtained is ground, pulverized, or the like to a suitable particle size, or range of particle sizes. The resulting material is then contracted with one or more leachants, or a series of leachants, such as acids, bases, or other useful solvents, depending on the impurity, whereby non-oxidation reaction product materials such as unoxidized parent metal, alloy constituents of the parent metal, metals derived from dopants, or combinations of each, are removed from the material. This leaching process is continued for a time sufficient to remove the aforesaid non-oxidation reaction product materials from the comminuted polycrystalline product so that a material having a purity of not less than 99.99% by weight can be recovered, and more preferably 99.99% or purer.

A feature which has been discovered concerning oxidation reaction product produced by the method of the present invention is that these products have extremely clean grain boundaries with no impurities present. This factor results in a property of intragranular fracture in the materials, a feature frequently absent in many traditionally-produced ceramic materials. Such property in ceramics has been linked to superior performance in certain applications such as abrasives and polishing media.

In another aspect of the present invention, a means of forming a high purity ceramic material is provided not only by the oxidation reaction of parent metal but by the upgrading (as discussed herein, "upgrading" or having a purity which is "greater than", should be understood as meaning that a resulting product has a purity which has been increased at least 0.1% by weight i.e., at least some impurities have been removed, however, preferably, the purity level in most cases has been increased at least 1% by weight) of a lower grade ceramic particulate product by the simultaneous reduction reaction of parent metal with oxide impurities in such product during the oxidation growth process. In this case, a parent metal is positioned or oriented relative to a permeable mass of filler material in the presence of an oxidant (typically air), so that formation of the oxidation reaction product will occur in a direction towards and into the mass of filler. Such growth of oxidation reaction product infiltrates or embeds the mass of filler thereby forming an oxidation reaction product/metallic composite ceramic structure. The filler material may be a loose or bonded array characterized by interstices, openings or intervening spaces, and the bed or mass is permeable to the vapor-phase oxidant and to the growth of oxidation reaction product. As used herein and in the appended claims, "filler" or "filler material" is intended to mean either a homogeneous composition or a heterogeneous composition comprised of two or more materials.

While the present invention discloses primarily alumina materials, wherein an aluminum parent metal is utilized alone or in combination with an alumina filler, it should be understood that other parent metal systems will also function in a similar manner to aluminum parent metal systems. For example, silicon, titanium, tin, zirconium, hafnium, etc. all form suitable oxidation reaction products, as discussed in the Patent and Patent Applications herein incorporated by reference. Moreover, each oxidation reaction product can be grown towards an oxidant without the use of a filler material, or a corresponding filler material can be utilized in combination with an oxidation reaction product.

More particularly, in the case where an oxidation reaction product is desired to embed a filler material, the oxidation reaction product grows into the filler, without disruption or displacement of the filler constituents, thereby forming an oxidation reaction product/metallic composite. Oxide impurities in the corresponding filler material are reduced by a reduction reaction between the parent metal and oxide impurities in the corresponding filler material to yield purer filler material constituents, and residual metallic constituents. The resulting oxidation reaction product/metallic composite is then crushed or otherwise comminuted and its residual metallic impurities are removed by leaching with leachants, thereby yielding a high purity particulate product.

In this specification and the appended claims the following terms have the following meaning:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the dopant or the filler, most typically within the range of from about 1–40% by volume, but may include still more metal.

"Oxidation reaction product" means one or more metals in any oxidized state wherein the metal(s) have given up electrons to or shared electrons with another element, compound, or combination thereof. Accordingly, an "oxidation reaction product" under this definition includes the product of the reaction of a parent metal with oxygen.

"Oxidant", "vapor-phase oxidant" or the like, which identifies the oxidant as containing or comprising a particular gas or vapor, means an oxidant in which the identified gas or vapor is the sole, or predominant, or at least a significant oxidizer of the parent metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "oxygen-containing gas" oxidant.

"Parent metal" refers to that metal, (e.g., aluminum) which is the precursor for the polycrystalline oxidation reaction product, and includes that metal as a relatively pure metal, a commercially available metal with impurities and/or alloying constituents, or an alloy in which that metal precursor is the major constituent; and when aluminum metal is mentioned as the parent metal, the metal should be read with this definition in mind unless indicated otherwise by the context.

DETAILED DESCRIPTION OF THE INVENTION AND PREFERRED EMBODIMENTS

While aluminum is referred to primarily herein, it is to be understood that other parent metals such as silicon, titanium, tin, zirconium, hafnium, etc. also function according to the invention. In accordance with one aspect of the present invention, the parent metal (which typically is doped, as explained below in greater detail) as the precursor to the oxidation reaction product, is formed into an ingot, billet, rod, plate, or the like, and placed in an inert bed, crucible or other refractory container. This container with its contents is placed in a furnace which is supplied with an oxygen-containing vapor-phase oxidant. This setup is heated to temperatures below the melting point of the oxidation reaction product but above the melting point of the parent metal, which temperatures, in the case of alumina, are generally between about 850°–1450° C., and more preferably between about 900°–1350° C. Within this operable temperature interval or range, a body or pool of molten metal forms, and on contact with the oxygen-containing vapor-phase oxidant, the molten metal will react to form a layer of oxidation reaction product. In certain cases, however, wherein a dopant material such as magnesium (e.g., in the case of an aluminum parent metal) is used in conjunction with the aluminum parent metal, the formation of the alumina oxidation reaction product may be preceded by the formation of a thin spinel layer such as magnesium aluminate spinel (as discussed below in greater detail). Upon continued exposure to the oxidizing environment, molten metal is progressively drawn into and through any previously formed oxidation reaction product in the direction of the vapor-phase oxidant. On contact with the oxidant, the molten metal will react to form additional oxidation reaction product, and thus form a progressively thicker body of oxidation reaction product while leaving residual metallic constituents dispersed through the polycrystalline material. The reaction of the molten parent metal with the oxygen-containing vapor-phase oxidant is continued until the oxidation reaction product has grown to a desired limit or boundary, and desirably is continued for a time sufficient to react all or substantially all of the parent metal with the oxygen-containing vapor-phase oxidant. The resulting ceramic body is comminuted to a desired particle size by conventional techniques such as impact milling, roller milling, gyratory crushing or the like.

As explained above, the ceramic product formed may contain metallic components such as nonoxidized parent metal, alloying constituents of the parent metal or dopant materials. The amount of metal can vary over a wide range of 1 to 40 percent by volume, and sometimes higher, depending largely upon the degree of exhaustion (conversion) of parent metal used in the process and/or the identity and amount of dopant or dopants employed. Typically, it is desirable to react substantially all of the parent metal with the oxygen-containing vapor-phase oxidant in order to minimize the amount of parent metal which has to be subsequently removed in the solvent extraction step. Additionally, the oxidation reaction product is usually more easily fractured than the metal constituents, which therefore may remain as larger particles. Thus, limiting the amount of metal included in the ceramic body minimizes or mitigates the work required in comminuting the ceramic body and in the solvent extraction operation. In some cases, it may be desirable to first physically separate the larger particles of metal from the oxidation reaction product as by screening prior to the extraction step in order to mitigate the processing necessary in this operation.

The comminuted oxidation reaction product is then contracted with one or more appropriate leachants or series of leachants to remove, dissolve, disperse or the like non-oxidation reaction product materials (or corresponding filler materials), resulting from the formation of the ceramic body, from the parent metal. A leachant may comprise an acid, mixture of acids, base or alkali, mixture of bases, or other solvent, which is suitable to dissolve or remove the particular materials, such as parent metals or dopant metals, without substantially degrading the product. A leachant may comprise a liquid such as an acid solution, as gas or vapor such as chlorine gas (e.g., with an aluminum parent metal), or other fluid mediums such as supercritical solvent systems. Additionally, more than one leachant may be used in series in order to remove various materials which each can be more easily and/or efficiently removed with a particular leachant which is not suitable, or as suitable, for removal of other materials present. For example, the comminuted polycrystalline ceramic product containing unreacted aluminum and silicon as a dopant in the oxidation reaction process first may be contacted with an acid leachant to remove certain metals (e.g. aluminum), water-washed, then contacted with a caustic leachant to remove other metals (e.g. silicon), water-washed again, and a relatively pure alumina is recovered. Additionally, in accordance with the present invention, the comminuting and leaching sequence may be repeated one or more times with the same polycrystalline product to obtain an alumina material having a higher purity.

A leachant, or series of leachants, is chosen primarily for its ability to dissolve or remove one or several of the particular materials (herein sometimes referred to as "residual metal" or "residual metallic constituents") present in the comminuted polycrystalline ceramic product. Most typically, those materials comprise non-reacted (i.e., non-oxidized) portions of the parent metal, alloy impurities from the parent metal, dopant metal or metals resulting from the reduction of dopant materials (e.g. Si from $SiO_2$). Therefore, a leachant or series of leachants must be chosen with the particular materials to be removed in mind. For example, unreacted aluminum metal present in the oxidation reaction product can be effectively removed with an acid such as 50% HCl. To hasten the process or improve the efficiency of the same, the leaching setup, comprising the comminuted polycrystalline ceramic product contacted with the particular leachant, may be agitated and/or heated. In addition to unoxidized aluminum, the comminuted oxidation reaction product typically contains one or more metals resulting from the dopant materials. In some cases, for example, when silicon or a silicon-containing dopant is employed, an acid medium may not satisfactorily remove the non-alumina metal (e.g. silicon). Therefore, a second leachant such as an alkali (e.g. caustic soda solution) will be necessary to remove those materials. However, care should be taken when employing a series of separate leachants to avoid a mixture or combination of leachants which may be hazardous or defeat the designed effectiveness of the leaching, which may be avoided, for example, by a suitable purge such as a solvent wash (e.g. deionized water). The polycrystalline ceramic product is contacted with the leachant, or series of leachants, for a time sufficient to dissolve away or otherwise remove substantially all of the non-alumina materials. Thus, the alumina material is recovered having a purity of typically not less than 99.9% by weight alumina, and preferably 99.99%.

As explained in the Commonly Owned Patent and Patent Applications, the addition of dopant materials, in conjunction with the parent metal, can favorably influence the oxidation reaction process. The function or functions of the dopant material can depend upon a number of factors other than the dopant material itself. These factors include, for example, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the parent metal (1) may be provided as alloying constituents of the parent metal, or (2) may be applied to at least a portion of the surface of the parent metal, or any combination of techniques (1) and (2) may be employed. For example, an alloyed dopant may be used in combination with an externally applied dopant. A source of the dopant may be provided by placing a rigid body of dopant in contact with at least a portion of the parent metal surface. For example, in the case of aluminum, a thin sheet of silicon-containing glass can be placed upon a surface of the aluminum parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic material occurs. In the case where the dopant is externally applied to at least a portion of the surface of the aluminum parent metal, the polycrystalline aluminum oxide structure generally grows substantially beyond the dopant layer (i.e., to beyond the depth of the applied dopant layer). In any case, one or more of the dopants may be externally applied to the parent metal surface. Additionally, any concentration deficiencies of the dopants alloyed within the parent metal may be augmented by additional concentration of the respective dopant(s) applied external to the aluminum parent metal.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1-10% by weight based on the total weight of the resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting alumina polycrystalline oxidation reaction product growth, from aluminum parent metal systems are, for example, silicon, germanium, tin and lead, especially when used in combination with magnesium. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead us a dopant is generally alloyed into the aluminum-based parent metal at a temperature of at least 1000° C. so as to make allowances for its low solubility if aluminum; however, the addition of other alloying components, such as tin, will generally increase the solubility of lead and allow the alloying materials to be added at a lower temperature.

One or more dopants may be used in conjunction with the parent metal. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium and lithium, which may be used individually or in combination with one or more other dopants depending on the process conditions. Sodium and lithium may be used in very small amounts in the parts per million range, typically about 100-200 parts per million, and each may be used alone or together, or in combination with other dopant(s). Calcium, boron, phosphorus, yttrium, and rare earth elements such as cerium, lanthanum, praseodymium, neodymium and samarium are also useful dopants, and herein again especially when used in combination with other dopants.

The dopant materials when used externally are usually applied to a portion of a surface of the parent metal as a uniform coating thereon. The quantity of dopant is effective over a wide range relative to the amount of a parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram of parent metal, or about 0.0001 gram of silicon per square centimeter of exposed parent metal surface, together with a second dopant having a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than about 0.0008 gram of Mg per gram of parent metal to be oxidized and greater than 0.003 gram of Mg per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions. However, increasing the amount of dopant material employed typically results in increased processing time in the leaching step to remove the included dopant material.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting prior to comminuting the polycrystalline ceramic product.

In accordance with the present invention, a ceramic body is fabricated as per the method disclosed in the Commonly Owned Patent, referred to above, using a 10% silicon, 3% magnesium-containing aluminum alloy, heated in air at 1200° C. The resulting ceramic body is comminuted to approximately minus 500 mesh particle size. The comminuted oxidation reaction product is contacted with a 50% hydrochloric acid/deionized water solution for 24 hours while agitating. The material is elutriated with deionized water, and subsequently contacted with 50% sodium hydroxide/deionized water solution for 24 hours. The material is then elutriated several times with deionized water for 24 hours, and the resulting high purity alumina material is recovered.

In another aspect of the present invention, a body or mass of a corresponding filler material is placed in an oxygen-containing environment adjacent to a parent metal source with appropriate dopants as described above, so as to be presented in the path of the subsequently developing oxidation reaction product growth. The combination might consist, for example, of a bar of 5052 aluminum alloy submerged with a refractory boat containing a surrounding of an particulate powder or grain, such as mullite/alumina mixture. The combination is heated, for example to 1150° C., and a composite results, containing high purity alumina, aluminum, silicon and other trace metals. The resulting composite is comminuted, leached with acid, elutriated with water, and then leached with alkali and again washed with water to yield a high purity alumina grain or powder.

In a further example, a rectangular ingot of aluminum alloy 5052 (having a nominal composition by weight of 2.4% Mg, and not more than 0.5% Si and Fe) measuring 9×4×1½ inches is placed into a refractory vessel containing a bedding of refractory alumina particles (El Alundum, from Norton Co., 90 mesh) such that one 9×4 inch rectangular face is exposed to the atmosphere. A thin layer of silicon dioxide particles (−140 mesh), a dopant, is dispersed over the exposed surface of the ingot. This setup is placed into a furnace having an orifice through which a continuous supply of air can pass, and heated up to 1125° C. over 10 hours. The furnace is held at 1250° C. for 165 hours, and then cooled down over 10 hours. The resulting ceramic body is recovered and comminuted, by crushing between steel plates, to an approximate particle size range of −200 mesh. Thus, approximately 250 grams of the comminuted material is placed into a 1-liter beaker containing 500 ml of a 50% HCl solution, a suitable leachant for the nonoxidized aluminum and iron metals. This solution is heated to approximately 85° C. and agitated by stirring for 48 hours. The acid solution is decanted, and the material is rinsed with deionized water. Subsequently, the extraction procedure described above is repeated, but with 500 ml of 50% NaOH, a suitable leachant for the silicon. The material is rinsed thoroughly with deionized water, and the alumina is recovered.

The products produced according to the present invention may be useful in the production of sintered ceramic articles or as polishing media. For such articles, in the case of alumina, the alumina desirably has a mesh size of about 500 or finer, and more preferably about one micron or less.

What is claimed is:

1. A method for upgrading the quality of a corresponding filler material comprising the steps of:
   (a) positioning a parent metal comprising a material selected from the group consisting of silicon, titanium, tin, zirconium and hafnium adjacent to a corresponding mass of filler material, said corresponding mass of filler material containing at least one impurity which is reducible by the parent metal, so that formation of an oxidation reaction product of the parent metal will occur in a direction towards and into said mass of corresponding filler material;
   (b) heating said parent metal to a temperature range above its melting point but below the melting point of its oxidation reaction product to form a body of molten parent metal and reacting the molten parent metal with an oxygen-containing vapor-phase oxidant at said temperature to form said oxidation reaction product, and at said temperature maintaining at least a portion of said oxidation reaction product in contact with and extending between said body of molten metal and said oxidant, to draw molten metal through the oxidation reaction product towards the oxidant and towards and into the adjacent mass of corresponding filler material so that fresh oxidation reaction product continues to form within said mass of corresponding filler material at an interface between the oxidant and previously formed oxidation reaction product, and continuing said reacting for a time sufficient to embed at least a portion of said corresponding mass of filler material within said oxidation reaction product to produce a ceramic body comprising an oxide of said parent metal and at least one residual metallic constituent, whereby said at least one impurity is at least partially reduced and is contained in said at least one residual metallic constituent;
   (c) comminuting said ceramic body;
   (d) providing at least one leachant capable of dissolving or removing said at least one residual metallic constituent without substantially degrading said oxidation reaction product and embedded filler material in the produced ceramic body and contacting said comminuted ceramic body with said at least one leachant for a time sufficient to remove or dissolve away said at least one residual metallic constituent from said comminuted ceramic body to produce a substantially pure material having a purity which is greater than the purity of said corresponding filler material;
   (e) recovering said substantially pure material.

2. The method of claim 1, wherein said at least one leachant comprises at least one acid material and at least one base material.

3. The method of claim 1, further comprising, after recovery of said substantially pure material in step (e), comminuting said recovered substantially pure material a second time to a smaller particle size followed by a subsequent contacting of the twice comminuted substantially pure material with said at least one leachant to further remove or dissolve away any said at least one residual metallic constituent, thereby further increasing the purity of the twice comminuted substantially pure material.

4. The method of claim 1, wherein an initiation layer is produced on a surface of said ceramic body in step (b), which layer is then removed prior to step (c).

5. The method of claim 1, wherein said oxygen-containing vapor-phase oxidant comprises air.

6. The method of claim 1, wherein a dopant is used in conjunction with said parent metal.

7. The method of claim 1, wherein said at least one leachant comprises at least one acid material.

8. The method of claim 1, wherein said at least one leachant comprises at least one base material.

* * * * *

UNITED STATES PATENT AND TRADEMARK OFFICE
CERTIFICATE OF CORRECTION

PATENT NO. : 4,871,696

DATED : October 3, 1989

INVENTOR(S) : Marc S. Newkirk et al.

It is certified that error appears in the above-identified patent and that said Letters Patent is hereby corrected as shown below:

Column 1, line 44: delete "Pat.";
          line 47: change "Jan. 7" to --Jan. 17--.
Column 7, line 7: change "contracted" to --contacted--.
Column 9, line 7: change "us" to --as--.

Signed and Sealed this

Eleventh Day of January, 1994

Attest:

BRUCE LEHMAN

Attesting Officer      Commissioner of Patents and Trademarks